United States Patent [19]

Voloshin et al.

[11] Patent Number: 4,529,898
[45] Date of Patent: Jul. 16, 1985

[54] ELECTRODYNAMIC GENERATOR FOR GENERATING SEISMIC PULSES

[75] Inventors: Nikolai V. Voloshin; Jury A. Baru; Anatoly I. Makogon; Boris I. Tokar; Georgy G. Kondratenko, all of Kharkov; Mikhail I. Zhuchkov, Moscow; Igor P. Lobas, Kiev; Saul G. Osyatinsky, Kharkov; Igor T. Zaitsev, Kharkov; Sergei M. Gekker, Kharkov; Ivan Z. Gontovoi, Kiev; Kim S. Gasilovsky, Lvov, all of U.S.S.R.

[73] Assignee: Spetsialnoe Proektno-Konstruktorskoe I Tekhnologiches-Koe Bjuro, Kharkov, U.S.S.R.

[21] Appl. No.: 473,209

[22] Filed: Mar. 8, 1983

[51] Int. Cl.³ .................................. H02K 33/00
[52] U.S. Cl. ........................ 310/15; 310/30; 310/27; 367/189
[58] Field of Search ............... 310/77, 30, 15; 367/189

[56] References Cited

U.S. PATENT DOCUMENTS

| | | | |
|---|---|---|---|
| 3,287,696 | 11/1966 | Cholet et al. | 310/15 |
| 3,353,040 | 11/1967 | Abbott | 310/27 |
| 3,610,973 | 10/1971 | Bauer et al. | 310/15 |
| 3,737,692 | 6/1973 | Rahn | 310/15 |
| 3,942,051 | 3/1976 | Stevinson et al. | 310/15 |

Primary Examiner—Donovan F. Duggan
Attorney, Agent, or Firm—Ladas & Parry

[57] ABSTRACT

A generator for generating seismic pulses comprises an armature and a stator coaxially arranged relative one another. The magnet cores of both the stator and the armature have on their active surfaces alternately disposed annular projections and annular slots. The winding sections are laid into and flush with said slots. The windings of the armature and of the stator are arranged to face one another. The generator is provided with means for fixing it in a vertical and a horizontal planes. In case the armature is made two times shorter than the stator the sections of the winding of said armature are arranged in groups. The number of the sections in each group of the stator equals the number of the sections of the armature. Such arrangement of the component parts enables the armature to reciprocate and to thereby provide formation of lateral seismic waves.

9 Claims, 18 Drawing Figures

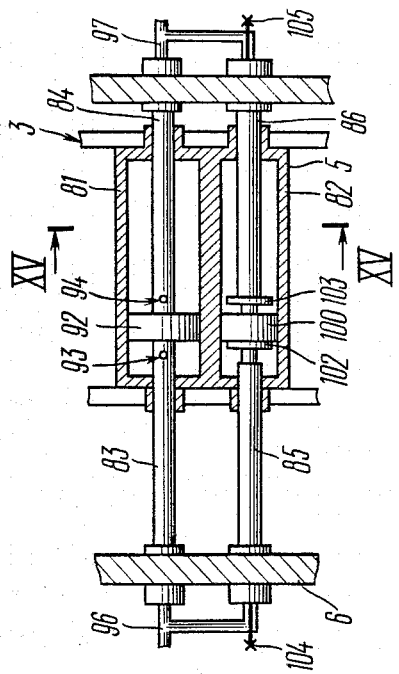
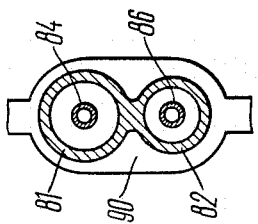
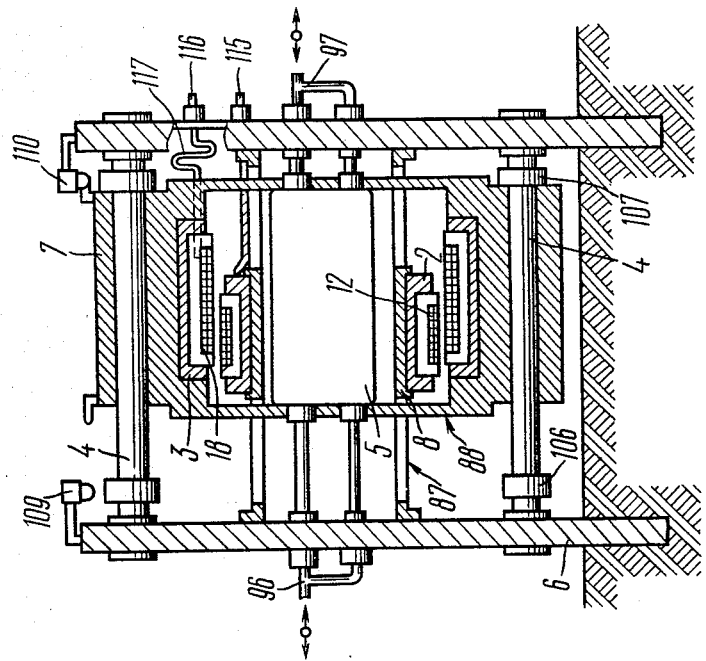
FIG.15
FIG.16
FIG.14

ELECTRODYNAMIC GENERATOR FOR GENERATING SEISMIC PULSES

BACKGROUND OF THE INVENTION

1. Field of the Invention

The present invention relates to devices for generating mechanical pulses, and is particularly concerned with electrodynamic generators for exciting seismic pulses.

The invention is of particular advantage in the case of seismic survey carried out with the purpose of civil-engineering surveying or prospecting for minerals.

2. Prior Art

Among the known methods of generating seismic waves which are now in use, non-explosive methods are finding ever increasing application. The advantages of the non-explosive methods lie in that they ensure a safe operation and rule out adversely affecting the environment, and enable controlling parameters of the excited waves, which is not less important.

The non-explosive methods of generating seismic waves are carried out with the aid of various devices. Thus, there is known a gas-dynamical generator for generating seismic waves (cf. U.S. Pat. No. 3,351,153), wherein the seismic impulses are produced by acting on the earth surface with the energy generated by explosion of an explosive gas mixture. The explosion of the gas mixture takes place within a closed space of an explosion chamber having a sleeve and a piston arranged for relative movement. Under the pressure of the explosion products the sleeve bottom of the explosion chamber is forced into the ground, thereby producing a seismic wave.

However there is a number of disadvantages associated with application of devices of the gas-dynamic type, which are:

(1) hazard for attending personnel who may happen to be close to the explosion chamber is not fully eliminated, though said hazard is less in comparison with the explosive methods;

(2) controlling the duration of the explosion process within the explosion chamber is complex to effect, the hence controlling the spectral composition of the waves being generated is difficult to carry out, which limits the use of the seismic survey methods with respect to the resolving power thereof.

There is also known a method of generating mechanical oscillations, which method consists in applying an electric pulse to an electrodynamic converter. Said electrodynamic converter converts an electric pulse to a mechanical pulse (cf. USSR Author's Certificate No. 475,580).

This method is carried out with the use of a known in the art electrodynamic generator (cf. USSR Author's Certificate No. 233,947) which comprises an armature and a stator arranged concentrically relative one another, and each having a frame with a cylindrical magnet core. The active surfaces of said magnet cores face one another and have alternately disposed projections and slots to receive a winding in the form of sections which form a row of opposite poles. The generator further includes a supporting element and inertial mass connected to the armature and the stator respectively, and also a guide and a shock-absorber of said stator.

On the active surfaces of the magnet cores of the armature and of the stator there are provided screw threads to form projections and slots. Wound on the active surface of the magnet cores is a winding composed of separate sections. The sections are made from conductors of various sizes and are connected to each other. Some sections are higher and laid into the slots of the magnet core, and the other sections are lower and are laid onto the projections of the magnet core.

Although the above electrodynamic generator is more advantageous as compared to the prior art there are still some difficulties which are encountered in employing this generator.

Thus, since the windings of the armature and of the stator are kept in position on the magnet cores owing to that their sections are partially inserted in the slots, said windings may be caused by the electrodynamic force to run off from the magnet core, which affects the reliability of the device.

Furthermore, the electrodynamic force produced as a result of interaction of the currents flowing in the windings of the armature and of the stator is directed at an angle to the longitudinal axis of the generator. This is due to the fact that said force is perpendicular to the lateral surfaces of said thread, which causes a tangential force, and hence a torque, thereby decreasing the axial force applied to the ground.

The manufacture of such generators is made much complex due to the necessity of making windings from wires of two different sizes.

The above generator has a relatively high specific consumption of materials (copper, electrical-sheet steel) due to a relatively large clearance between the surfaces of the magnet cores of the armature and of the stator.

SUMMARY OF THE INVENTION

An object of the invention is to provide a seismic-wave electrodynamic generator, which is more reliable than the prior art devices.

Another object of the invention is to provide a seismic-wave electrodynamic generator which at the same level of energy consumption as the prior art devices provides generating an electrodynamic force of a greater magnitude.

Still another object of the invention is to provide a seismic-wave electrodynamic generator which requires a relatively lower specific consumption of materials for its manufacture.

Yet another object of the invention is to simplify the manufacture of a seismic-wave electrodynamic generator.

A further object of the invention is to provide a seismic-wave electrodynamic generator which, when applied in automatic mode of operation, generates seismic impulses alternately in opposite direction.

A still further object of the invention is to provide a seismic-wave electrodynamic generator having a relatively high utilization factor of its active portion through decreasing leakage fluxes inside the pole winding and interpole connections.

These and other objects are accomplished by that in an electrodynamic generator for generating seismic waves, comprising an armature and a stator concentrically arranged relative one another and each having a frame with a cylindrical magnet cores whose active surfaces face one another and have alternately disposed projections and slots, said slots adapted to receive an electric winding composed of sections forming a row of opposite poles, a supporting element and inertial mass connected to the armature and the stator respectively, a guide and a shock-absorber of the stator, according to the invention said projections and slots of the armature and of the stator are made annular, the section of the windings are laid into the annular slots flush therewith, the annular projections of the magnet core of the stator are located opposite to the sections of the armature windings, and the annular projections of the magnet core of the stator are located opposite to the sections of the stator windings.

Due to the fact that the sections of the winding are deep-laid into the slots, practically flush with the surface of the corresponding magnet core said sections are rigidly secured in position, which in turn prevents their running off from the magnet cores when the stator and the armature move under the action of the electrodynamic force. In addition, the annular shape of the slots and their being located perpendicular to the longitudinal axis of the generator provide for generating an electrodynamic force directed perpendicularly to the wall of the annular slot and correspondingly along the longitudinal axis of the generator. Further, since the sections of the winding are located only in the slots of the magnet cores the surfaces of the latter may be located closer to one another, thereby decreasing the gap therebetween.

It is expedient that the annular slots of the magnet cores of the armature and of the stator be made wider than the annular projections of said magnet cores, which will enable producing maximum force at minimum consumption of the electric energy.

It is further expedient that each section of the winding of the armature and of the stator be composed of a first and a second portions, each connected to a corresponding portion of the adjacent sections through connecting conductors laid in a bifilar manner into ducts provided in the annular projections of the corresponding magnet core, the first and the second portions of the sections disposed in one end annular slot of the corresponding magnet core have terminal leads, and the first and the second portions of the sections disposed in the other end annular slot of the corresponding magnet core are directly coupled with one another.

Due to the bifilar arrangement of the connecting conductors the leakage fields of these conductors are considerably reduced, which in turn contributes to a higher power factor of the apparatus. This is very important in the case of a pulse-type electrodynamic generator, whose operation is especially affected by the influence of the winding inductance.

It is useful that the generator be provided with an enclosure made in the form of a cap to the cover of which is rigidly connected the end of said guide of the stator and is pivoted the end of the rod of the shock-absorber of the same stator. The enclosure envelops the armature so that the latter may move longitudinally therewithin, and the armature frame is connected with the guide of the stator for their relative movement.

A movable joint of the armature and the enclosure and a movable joint of the armature frame and the guide of the stator makes it possible to reduce the weight of the armature. Hence, causing the armature to move will require less energy so that more energy may be applied to the ground.

It is advisable to provide the generator with a mechanism for fixing said generator in a horizontal plane, a mechanism for fixing said generator in a vertical plane, and a lifting mechanism, all said mechanisms being adapted to hold the generator in a transportation position.

The mechanism for fixing the generator in a horizontal plane may be formed by an annular projection provided on the enclosure surface, said annular projection having conical lateral surfaces and provided with guides interacting with stationary rollers; the mechanism for fixing said generator in a vertical plane may be formed by the other annular projection provided on the enclosure and interacting with adjustable stops, and the lifting mechanism may be made in the form of a hydraulic cylinder whose rod is pivotally connected to the upper portion of the enclosure.

Such construction of said mechanisms provides for a correct positioning of the generator during its transportation irrespective of its position on the ground when it is operated to produce seismic impulses.

It is recommended that the mechanism for fixing the generator in a horizontal plane be formed by rods secured to the enclosure and adapted to interact with the stationary rollers, the mechanism for fixing said generator in a vertical plane be provided with a pin-type lock adapted to be engaged in holes provided in the rods, and a lifting mechanism be made in the form of a hydraulic cylinder pivotally mounted in two planes perpendicular to one another and having its rod connected through a flexible member with the upper portion of the enclosure.

Such construction of said mechanisms enables simultaneously using two generators mounted on one vehicle to transport said generators to a predetermined region of the seismic exploration.

It is also recommended that the armature of the generator be made at least two times shorter than the stator, the annular slots with the sections of the winding laid thereinto on the magnet core of said stator be arranged in groups located at a distance from one another on the ends of the magnet core of the stator, the number of the annular slots with the sections of the winding in each group being equal to the number of the annular slots of the magnet core of said armature.

Such construction of the electrodynamic generator enables automatic excitation of seismic impulses alternately in the opposite directions.

A modification is also possible wherein the guiding arrangement is made in the form of at least two sliding columns rigidly connected with the supporting element provided with two plates adapted to be driven into the ground, disposed on either side of the armature and rigidly connected thereto. According to this modification the shock-absorber of the stator is made in the form of a pneumohydraulic cylinder block having its cylinders rigidly connected with the stator, and the rods connected with the plates of the supporting element (the expression "pneumohydraulic cylinder block" is used to mean a cylinder block which includes both pneumatic and hydraulic cylinders).

Such construction of the generator allows a reciprocating movement of the stator during a predetermined period of time irrespective of the magnitude of the electric impulse. In addition, the dimentions and the weight of the apparatus inspite of the fact that it provides for reciprocating movement are not increased. This is achieved by that in one and the same electrodynamic converter the braking length of the stator with the inertial mass is equal both to the right and to the left.

BRIEF DESCRIPTION OF THE DRAWINGS

The invention will now be explained in terms of embodiments thereof represented in the accompanying drawings, wherein:

FIG. 12b is a top view of FIG. 12a;

FIG. 14 illustrates in section the embodiment of the invention according to the modification in FIG. 13a,b;

FIG. 15 is a section of an enlarged portion of what is represented in FIG. 14;

FIG. 16 is a cross-sectional view of FIG. 15 along line XV—XV, showing a cylinder block in the body.

DETAILED DESCRIPTION OF THE INVENTION

Figure 5:
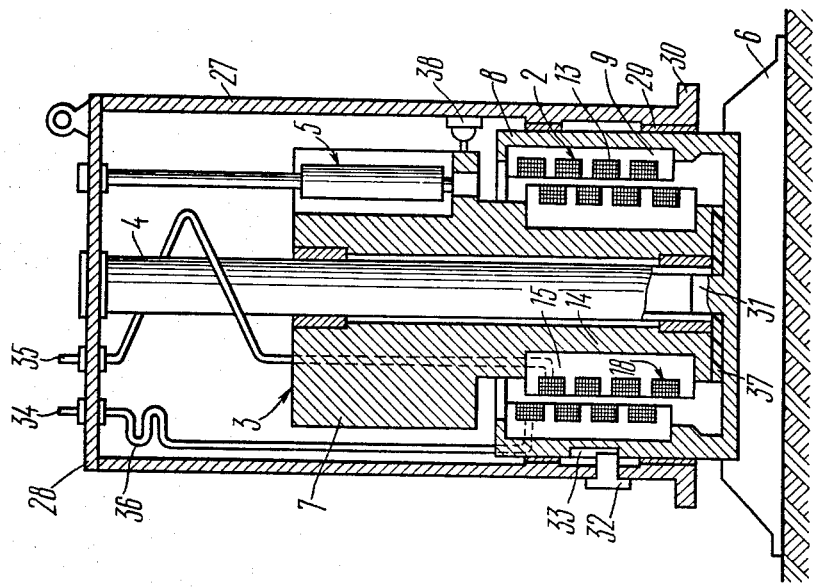
FIG. 5 is the same as in FIG. 1 except for that some element are added improving the operation of the proposed generator.

An electrodynamic generator 1 (FIG. 1) for generating seismic waves comprises an armature 2 and a stator 3 concentrically arranged relative one another. The stator 3 has a guide 4 to provide its movement, and a shock-absorber 5. Connected to the armature 2 of the generator 1 is a supporting element 6, and connected with the stator 3 is an inertial mass 7.

The armature 2 has a frame 8 to which is secured a hollow cylindrical magnet core 9 having on its active surface slots 10 and projections 11 alternately disposed relative one another.

In the slots 10 is laid an electric winding 12 composed of sections 13. The sections 13 form a row of opposite poles.

The stator 3 has a frame 14 to which is secured a hollow cylindrical magnet core 15 having on its active surface slots 16 and projections 17 alternately disposed relative each other. Laid in the slots 16 is an electric winding 18 composed of sections 19, which sections 19 form a row of opposite poles.

The active surface of the armature 2 and the active surface of the stator 3 are located so as to face one another.

Figure 1:
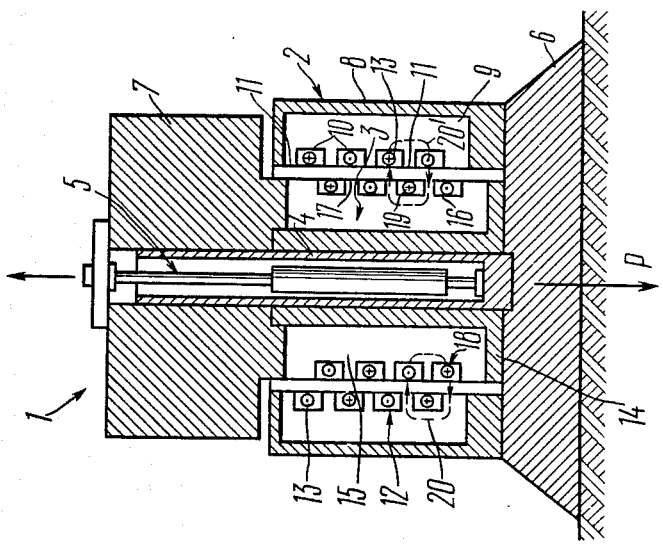
FIG. 1 schematically represents in longitudinal section an electrodynamic generator of the invention.

According to the invention the slots 10 and the projections 11 of the armature 2, and the slots 16 and the projections 17 of the stator 3 are made annular. As shown in FIG. 1, the sections 13 of the winding 12 of the armature 2 and the sections 19 of the winding 18 of the stator 3 are laid into corresponding annular slots 10, 16 on the corresponding magnet cores 9, 15 flush therewith. The annular projections 17 of the magnet core 15 of the stator 3 are disposed opposite to the sections 13 of the winding 12 of the armature 2, whereas the annular projections 17 of the armature 2 are disposed opposite to the sections 19 of the winding 18 of the stator 3.

Referring now to FIG. 1, the annular slots 10 of the magnet core 9 of the armature 2 and the annular slots 16 of the magnet core 15 of the stator 3 are made wider than the annular projections 11, 17 provided on the same magnet cores 9, 15.

The magnet core 9 of the armature 2 and the magnet core 15 of the stator 3 are made in the form of concentrically arranged hollow cylinders. These hollow cylinders are made of sheet steel and press-fitted into the frames 8 and 14 respectively.

The sections 13 of the winding 12 of the armature 2 and the sections 19 of the winding 18 of the stator 3 are disposed on the corresponding magnet cores 9, 15 and are connected with one another so (not shown in the drawings) that the currents in the adjacent sections flow in opposite directions, thereby forming rows of opposite poles along active surfaces of the corresponding cores 9 and 15.

The magnet field (field lines 20) produced by the current flowing in the winding 12 of the armature 2 interacts with the current of the winding 18 of the stator 3 to generate mechanical force P coinciding with the axis of the electrodynamic generator 1. Due to the direction of the currents shown in FIG. 1 the thus generated force urges the armature 2 downward and the stator 3 upward. The force acting on the armature 2 is transmitted to the supporting element 6 which in turn acts on the surface of the ground to thereby produce seismic waves.

The inertial mass 7 limits the travel of the stator 3.

Figure 2:
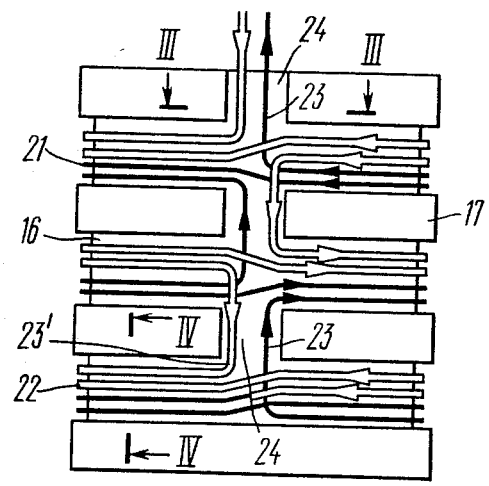
FIG. 2 schematically represents one modification of the stator winding of the proposed apparatus.

According to one embodiment of the invention each section 13 (FIG. 2) of the winding 12 of the armature 2 and each section 19 of the winding 18 of the stator 3 consists of a first portion 21 (shown in dark-colored lines) and a second portion 22 (shown in light-colored lines). The first portion 21 and the second portion 22 are connected to the corresponding portions, i.e. to the first portion 21 and the second portion 22 of the adjacent sections, through connecting conductors 23 and 23'. The connecting conductors 23 and 23' are bifilar-laid in ducts 24. The ducts 24 are provided in the annular projections 11, 17 of the magnet core 9 of the armature 2 and of the magnet core 15 of the stator 3 respectively. As shown in FIG. 2, the ducts are made on the outer surface of the stator 3. It is quite evident, however, that in the case of the armature these ducts are made on the inner surface of said armature, that is on the active surface thereof (not shown in the drawings).

Figure 3:
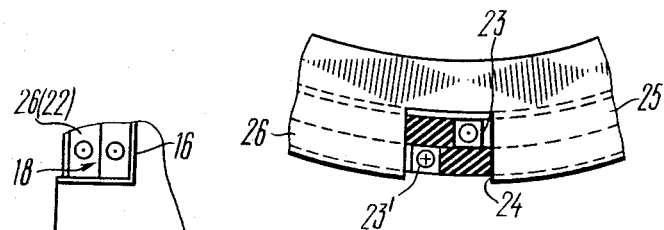
FIG. 3 is a partial view of FIG. 2, along line III—III.
Figure 4:
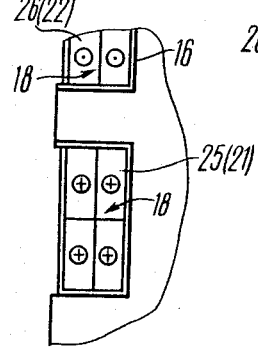
FIG. 4 is a partial view of FIG. 2, along line IV—IV.

When the winding 18 of the stator 3 is wound, starting, for instance, from the uppermost slot, the first layer to be laid is a lower layer 25 (FIGS. 3, 4) of the winding 18. Then, after passing through the duct 24 the winding is laid into the next slot 16, etc. In this case the direction of winding is changed each time, that is in each slot. After the lower layer 25 of the winding has been laid into the last slot the top layer 26 of the winding is wound in said last slot, whereafter through the duct 24 the winding operation is taken over to the next slot to start winding of the top layer 26. As shown in FIG. 4, the direction of winding both the lower layer and the top layer of the winding 18 in each slot coincides. Laying the winding 18 into all slots 16 is effected in a similar way.

When the current flows in the windings 12, 18 it does not change its direction within one coil (section), but does change to opposite direction in the adjacent coil (section), thus forming a row of opposite poles.

Since the currents in the connecting conductors 23 laid in one and the same duct 24 flow in opposite directions the combined current in said duct is close to zero.

Figure 6:
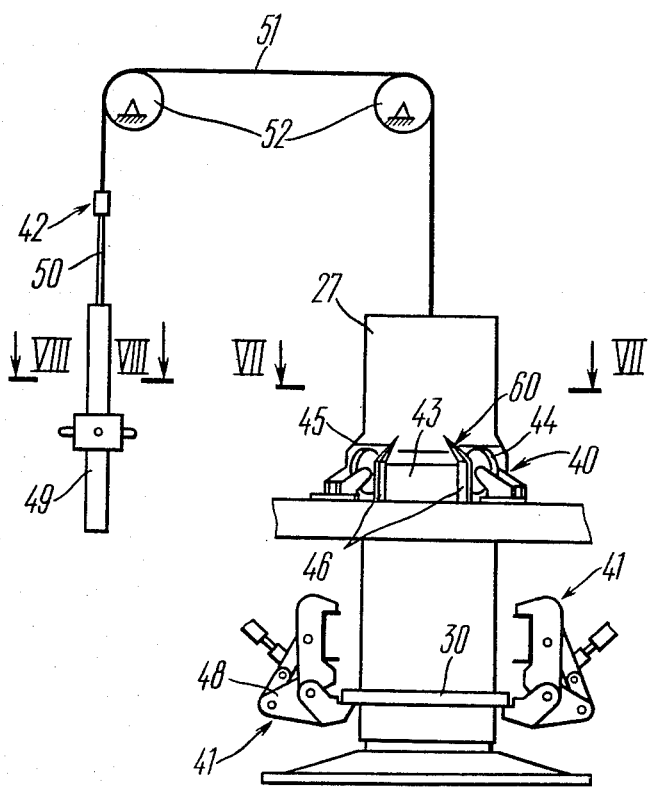
FIG. 6 schematically represents the proposed seismic impulse generator fitted with mechanisms for fixing and lifting it during transportation.

In another embodiment of the present invention the generator 1 (FIG. 6) is provided with an enclosure 27 made in the form of a cap. Rigidly connected to a cover 28 of the enclosure 27 is the end of the guide 4 of the stator 3 and hingedly connected to it is the end of the rod of the shock-absorber of the same stator. The enclosure 27 envelops the armature 2 so that the latter may freely move therein. The frame 8 of the armature 2 is connected with the guide 4 of the stator 3 for their relative movement.

The magnet core 9 of the armature 2 is made in the form of a collector stack made from electrical-sheet steel and press-fitted into the frame 8 of the armature 2. The frame 8 of the armature 2 is connected with the supporting element 6. On the inner surface of the magnet core 9 are disposed annular coils 13 (sections). The annular coils 13 form the winding 12 of the armature 2. The magnet core 15 of the stator 3 is also made in the form of a "collector" stack made from the electrical-sheet steel. The magnet core 15 is rigidly connected with an inertial mass 7. The inertial mass 7 and the frame 14 of the stator 3 are made integral.

The winding 18 of the stator 3 is located on the outer surface of the magnet core 15. The winding 18 is made in the form of annular concentric coils (not shown in the drawings).

The armature 2 and the stator 3 are concentrically arranged within one another. The armature 2 envelops the stator 3 and is mounted in a plain bearing 29 disposed on the inner surface of the enclosure 27.

The enclosure 27 has at its lower end a flange 30 which serves as a support during transportation of the generator 1. The armature 2, the frame 8 of the armature 2, and the supporting element 6 are rigidly connected to one another and serve as a working member while applying impulse to the ground. During applying the impulse to the ground the enclosure 27 remains stationary.

In the central part of the generator 1 is mounted a sliding column 4 the top end of which is rigidly connected with the cover 28 of the enclosure 27. The lower end of the column 4 may be readily centred by an aligning pin 31 which is rigidly secured to the lower inner side of the frame 8. As it may be clear from the above description, the armature 2 together with the pin 31 and the supporting element 6 may freely move downward relative the enclosure 27 and the column 4 for a distance equal to the value of deformation of the ground under the action of the power impulse.

For fixing the armature 2 in a transportation position there are provided two stops 32 which are rigidly secured to the enclosure 27. In the frame 8 of the armature 2 there are slots 33 to receive the stops 32. The slots 33 provide for downward movement of the armature 2 during the action of the power impulse. In addition, said slots also provide for fixing the armature 2 in position during transportation of the generator 1.

The windings 12, 18 are connected to the electric energy source through current conductors 34, 35. The current conductor 34 of the armature 2 have a flexible member 36 to prevent breakage of the current conductor 34 when the armature is moving downward.

The current conductor 35 of the winding 18 of the stator 3 is made spiral.

Smoothly lowering the stator 3 together with the inertial mass 7 is provided by the shock-absorber 5 which is a hydraulic cylinder 5. The body of the shock-absorber 5 is pivotally connected with the inertial mass 7.

Adjusting the position of the stator 3 relative the armature 2 is effected with the aid of a ring 37 made of non-magnetic material and disposed in the lower portion of the frame 8 of the armature 2. The ring 37 is rigidly secured to the frame 8 of the armature 2. To provide a remote control of the stator 3 in the initial position the generator 1 is provided with a contactless limit switch 38. The switch 38 also serves for switching the electric circuit (not shown in the drawings) to an automatic mode of operation of the generator 1 for generating a repeating impulse. In the transportation position the switch assembly 38 disconnect the electric circuit (not shown in the drawings) of the generator 1 and rules out a "false" generation of the power impulses.

The proposed generator 1 for generating seismic waves operates in the following manner.

When an electromagnetic pulse is applied across the winding 12 of the armature 2 (FIG. 5) and the winding 18 of the stator 3 an electrodynamic power pulse is produced which is transmitted from the armature 2 through the supporting element 6 to the ground. The armature 2 together with the frame 8 and the supporting element 6 are caused to move for a distance equal to a value of the soil deformation. The power pulse produces a seismic wave.

The back-blow of the power pulse is received by the stator 3 rigidly connected with the inertial mass 7, which stator 3 is caused to move together with the inertial mass 7 upward along the sliding column 4. After the action of the power pulse is over, the stator 3 keeps moving upwardly by inertia until it stops. The spiral current conductor 35 and hydraulic shock-absorber 5 do not impede a free upward movement of the stator 3. The enclosure 27 remains at rest. Due to the presence of the plain bearing 29 and the sliding column 4 it is connected neither with the frame 8 of the armature 2 nor with the stator 3 respectively.

As soon as the stator 3 stops it is forced down by gravity, in which case the hydraulic cylinder 5 provides for its smoothly going down to its initial position which is ensured by that the hydraulic fluid is urged to pass through calibrated orifices from one portion of the cylinder into another one (not shown in the drawings).

A modification of the proposed electrodynamic generator is possible, wherein the generator 1 (FIG. 6) is provided with mechanisms 40 and 41 adapted for fixing the generator in a horizontal and a vertical planes respectively, and also with a lifting mechanism 42, which mechanisms are adapted to be used to prepare the generator for transportation.

Figure 7:
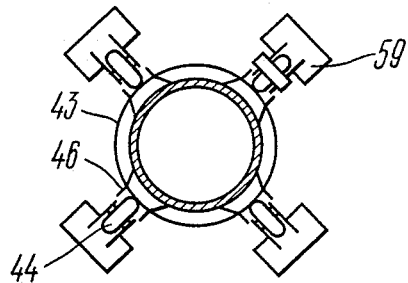
FIG. 7 is a cross-section of FIG. 6 along line VII—VII.

According to this modification of the proposed apparatus the mechanism 40 for fixing the electrodynamic generator in a horizontal plane is formed by an annular projection 43 provided on the surface of the enclosure 27, and rollers 44. The annular projection 43 (FIGS. 6, 7) has conical lateral walls 45 and longitudinal guides 46. The rollers 44 are stationary and mounted to be engaged with the surface of the annular projection 43.

The mechanism 41 for fixing said generator in vertical plane is formed by another annular projection 30 and adjustable stops 48 which are also stationary and mounted to interact with the lower lateral surface of the other annular projection 30.

Figure 8:
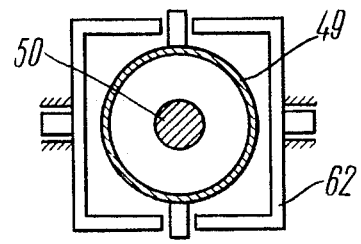
FIG. 8 is a cross-section of FIG. 6 along line VIII—VIII.

The lifting mechanism 42 (FIGS. 7, 8) has a hydraulic cylinder 49 which is mounted so that it swing in two planes perpendicular to one another. The end of the rod 50 of the hydraulic cylinder 49 is connected through a flexible member 51 to the enclosure 27 of the generator 1. The flexible member 51 is reeved in a stationary pulley block 52.

Figure 9:
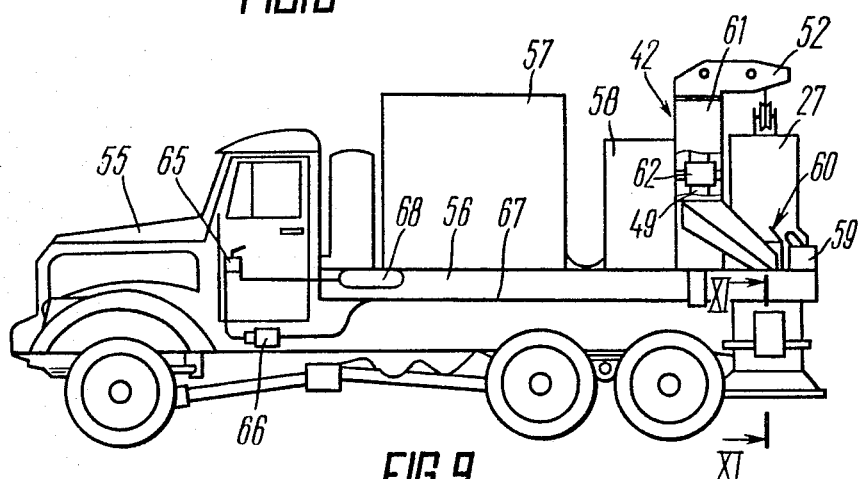
FIG. 9 shows an installation provided with the proposed generator for generating seismic impulses.
Figure 10:
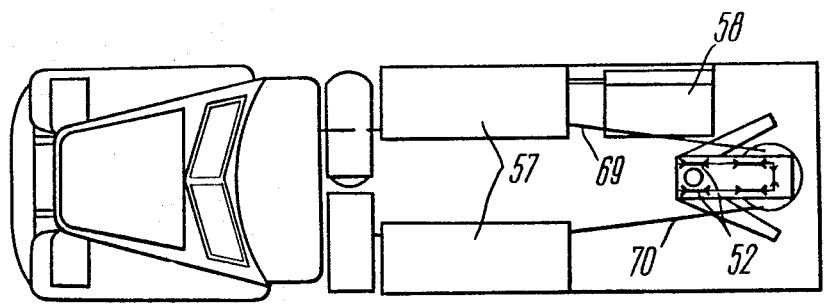
FIG. 10 is a top view in FIG. 9.

Referring now to FIGS. 9, 10, the electrodynamic generator 1 for generating seismic waves is mounted on a truck 55 (FIGS. 9, 10). On the truck bed 56 are mounted an energy accumulator 57, a control console 58, the generator lifting mechanism 42, the fixing mechanism for fixing and orienting said generator in a horizontal plane, and a mechanism 41 for fixing the same generator in a vertical plane.

Arms 59 rigidly mounted on the bed 56 of the truck 55 provide for a rigid connection of the stationary rollers 44 with the truck bed 56. Four rollers 44 spaced at an equal distance from each other embrace the generator 1. The guides 46 on the annular projection of the enclosure 27 have on their ends enlarged portions 60.

Mounted on the truck bed 56 is a T-shaped hollow support 61. Inside the support 61 is pivoted in the same vertical plane a carriage 62.

The carriage 62 carries a hydraulic cylinder 49 pivoted thereon for rotation in a vertical plane perpendicular to the plane of rotation of the carriage 62. In the upper part of the T-shaped support 61 is mounted a pulley assembly 52.

Figure 11:
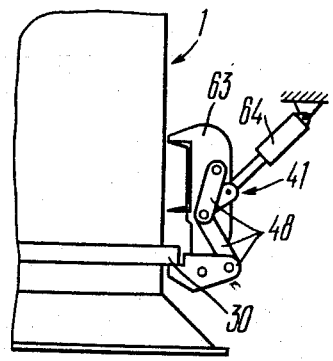
FIG. 11 is a partial cross-section of what is shown in FIG. 9, taken along line XI—XI.

The adjustable stops 48 of the mechanism for fixing the generator 1 are mounted on cantilevers 63 securedly fixed to the lower side of the bed 56 of the truck 55. Each adjustable stop 48 (FIG. 11) is made in the form of a three-bar gear mechanism with a pneumatic cylinder 64 which is connected to the source (not shown in the drawings) of compressed air, mounted on the truck.

In a transporation position the generator 1 is lifted and fixed in this position by the stops 48.

The mechanism for fixing the generator in a horizontal plane prevents displacement thereof in said horizontal plane during transportation, and the mechanism 41 for fixing the same generator in a vertical plane relieves the flexible member 51, the pulley assembly 52, the hydraulic cylinder 49, and the carriage 62 of a vertical load caused by the generator weight.

When the truck 55 is moving to the region of seismic exploration the electrodynamic generator 1 is in a raised position and fixed in a horizontal and vertical planes by the mechanisms 40 and 41 respectively.

Setting the generator 1 for operation is done in the following manner. A valve 65 of the duct of the pneumatic system of the truck 55 is opened and the pump 66 of the hydraulic system 67 is switched on, as a result of which the compressed air from the pneumatic system 68 is supplied to operate the pneumatic cylinders 64 of the stops 48 so as to let the generator 1 be lifted by the hydraulic cylinder 49, with the stops 48 being simultaneously moved aside from the enclosure 27 of the generator 1.

Then by turning the handle of the valve 65 to the position "sink" the generator is lowered onto the surface of the ground, in which case the pump 66 is switched off.

Thereafter, a power supply system is connected, which power supply system is a synchronous generator driven by the engine of the truck 55.

In response to a command signal from the control console 58 the charging circuits of the electric energy accumulator 57 are connected to start charging the latter. After the accumulator 57 is charged, a command signal is applied to the discharge circuit in response to which the current from the accumulator 57, through cables 69, 70, flows in the windings of the generator 1 to cause an electrodynamic force which is applied to the ground to thereby excite elastic seismic waves.

After recording reflected waves the truck 55 with the electrodynamic generator mounted thereon is driven to a next site of seismic exploration. By turning the handle of the valve 65 to the position "lift" the compressed air is supplied from the pneumatic system 68 of the truck to the drive (not shown in the drawings) of the hydraulic pump 66. The hydraulic fluid is pumped through the pipe-line into the rod end of the hydraulic cylinder 49.

As a result, the generator 1 is caused to move upward and centred by the mechanism 40 so as to take perpendicular position relative the bed 56 of the truck 55. The generator 1 being raised to its uppermost position, the handle 65 of the valve is set to the position "transport" to thereby operate the pneumatic cylinder 64 of the mechanism 41 for fixing said generator in a vertical plane, thereby preventing displacement of the generator downwardly. Being in such a position the generator is ready for transportation.

Figure 12A:
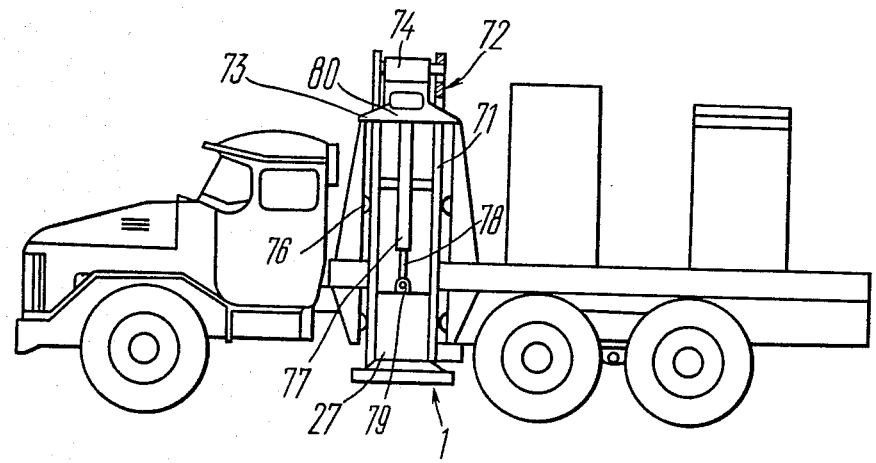
FIG. 12a shows one modification of the mechanisms for fixing the generator.

Shown in FIGS. 12a and b is another modification of the proposed apparatus wherein to the enclosure 27 of the generator 1 are secured rods 71 having in their upper portions holes 72. The generator 1 is embraced by a U-shaped support 73 on the cross-member of which is mounted a pin-type lock 74, and on the inner surfaces of the longer sides are mounted rollers 76. The U-shaped support is mounted stationary.

The pin-type 74 is engaged in the holes 72 of the rods 71 to thereby fix the generator in a vertical plane. The rollers 76 (FIG. 12) interact with the rods 71 to fix the generator 1 in a horizontal plane.

According to this modification of the proposed apparatus the lifting mechanism 42 is a hydraulic cylinder 77. The rod 78 of the hydraulic cylinder 77 is pivoted with the aid of a pin 79 to the enclosure 27 of the generator 1. The body 80 of the hydraulic cylinder 77 is connected with the cross-member of the U-shaped support 73 with the aid of the pin 80.

The rollers 76 are mounted on the inner sides of the U-shaped support 73 so that their position may be adjusted relative the rods 71.

Figure 12B:
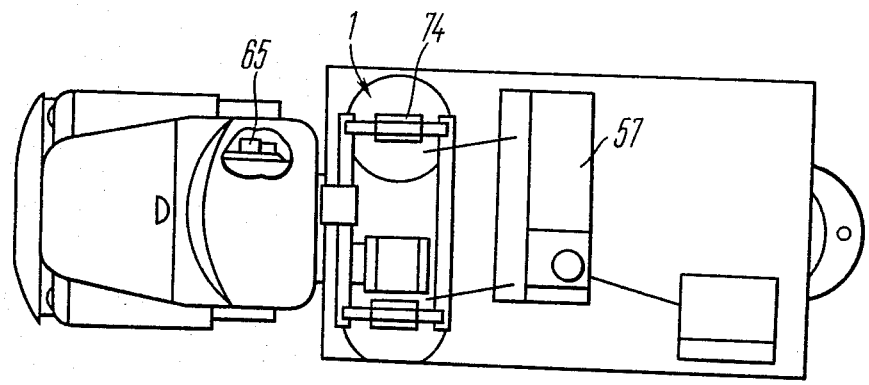

Such construction of the mechanism 40 for fixing the generator in a horizontal plane, of the mechanism 41 for fixing it in a vertical plane, and of the lifting mechanism, and the interconnection of these mechanisms enables simultaneously employing two generators 1 for generating seismic pulses as shown in FIG. 12b.

Figure 13A:
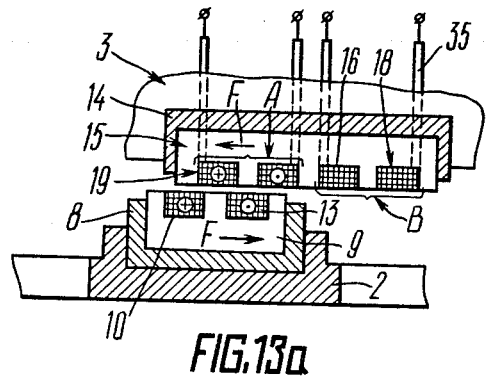
FIG. 13a, b schematically represents another modification of the proposed generator, illustrating a quantitative and space relationship of the armature winding and the stator winding, when said stator is in its right end position or left end position respectively.

In a further embodiment of the invention (FIGS. 13a, 13b) the armature 2 is at least two times shorter than the stator 3. The annular slots 16 on the magnetic core 15 of the stator 3 are arranged in groups A, B.

The groups A, B of the annular slots 16 are located on the ends of the magnet core 15 of the stator 3 and are spaced from one another. The number of the annular slots 16 with the sections 19 of the windings 18 in each group A, B of the magnet core 15 of the stator 3 equals the number of the annular slots 10 of the magnet core 9 of said armature 2.

As shown in FIG. 14, the guide 4 is made in the form of two horizontal sliding columns. The sliding columns 4 are securely connected to the supporting element 6. The supporting element 6 is formed by two plates 6 (vibrators) adapted to be driven into the ground. The plates 6 are disposed on the both sides of the armature 2 and rigidly connected therewith.

The shock-absorber 5 of the stator 3 is made in the form of a pneumohydraulic cylinder block 90. The cylinders 81, 82 of the cylinder block 90 is rigidly connected to the stator 3, and their rods 83, 84 and 85, 86 are connected with the supporting plates 6.

The stator 3 in enveloped by the inertial mass 7 which also serves as a rigid frame thereof.

In the inertial mass 7 are provided holes through which are passed the sliding columns 4 to which are securely fixed the supporting plates 6.

The armature 2 is located between the supporting plates 6 on the frame 8 which is rigidly connected to the supporting plates 6 and has slots 87 to receive the cantilevers 88. With the aid of the cantilevers 88 the cylinder block 90 is rigidly connected with the stator 3 and the inertial mass 7.

The cylinder block 90 includes two cylinders 81, 82 (FIGS. 15, 16), with the axis of the both cylinder running in parallel. Said cylinders 81, 82 are mounted in one rigid body 90. The larger cylinder 81 is a pneumatic cylinder, and the smaller cylinder 82 is a hydraulic cylinder.

Inside the pneumatic cylinder 81 is disposed a double-acting piston 92 having piston rods 83 and 84. The both ends of the pneumatic cylinder 81 are connected through radial holes 93 and 94, and axial holes (not shown in the drawings) provided inside the rods 83, 84, with the pneumatic systems 96, 97.

Inside the hydraulic cylinder 82 is disposed a double-acting piston 100 which has piston rods 85 and 86. The piston 100 is provided with valves 102 and 103 located thereon. On the end faces of the rods 85, 86 are mounted valve operating mechanisms 104, 105 of the valves 102, 103 valves 102, 103. The valves operating mechanisms 104, 105 are connected with the pneumatic system.

To fix the stator 3 with the inertial mass 7 in the initial position, that is "operating to the right" or "operating to the left" the guides 4 are provided with adjustable stops 106, 107.

Automtically controlling the operation of the shock-absorber 5 and the position of the stator 3 is effected with the aid of two contactless sensors 109 and 110 which interact with the pneumatic systems 96, 97. Connecting the winding 12 of the armature 2 to the generator is effected through a rigid current conductor 115, whereas connecting the winding 18 of the stator 3 to the same generator is effected with the aid of a current conductor 116 having a flexible portion 117 adapted to ensure a free movement of the stator 3 with the inertial mass 7 along the guides 4.

The above apparatus operates in the following manner.

When initially moving to the right (FIGS. 12a, 15) from the pneumatic system 97 the compressed air is passed, through the axial hole and radial hole 94 of the rod 84, into the right end of the pneumatic cylinder 81. The stator 3 with the inertial mass 7 is moved to the right up to the stop 107 (FIGS. 14, 16). The stator 3 stops automatically to take position "neutral" (the position of the maximum power pulse) to start operating to the right. The end position of the stator 3 is controlled with the sensor 110 connected with the pneumatic systems 96, 97. Simultaneously, under the action of the compressed air passed into the valve-operating mechanisms 104, 105 the valve 103 is opened and the valve 102 is closed. In this position the apparatus is ready to operate.

When an electric pulse is applied across the windings of the stator 3 and of the armature 2 a power pulse is generated which is transmitted from the frame of the armature 2 onto the supporting plates 6 through which said power pulse is applied to the ground to excite a lateral seismic wave in the earth. The back-blow of the power pulse is received by the stator 3 with the inertial mass 7, as a result of which said stator and inertial mass are caused to move along the guides 4 in the opposite direction, i.e. to the left. The hydraulic cylinder 82 of the shock-absorber 5 does not impede a smooth movement of the stator 3, since the valve 103 is open and the valve 102 is opened by the oil pressure produced in the right end of the cylinder 82 while the latter is moving together with the stator to the left. Simultaneously, the pneumatic cylinder 81 slows down the movement of the stator 3 due to compressing of the air in the right end of the cylinder 81. After the stator 3 has fully stopped it is brought back to its initial position by the compressed air. To prevent pounding of the stator against the stops 107 the hydraulic cylinder 82 brakes the movement of the stator 3 when the latter is travelling back to its initial position due to the fact that the valve 102 is closed and the hydraulic fluid is passed from the left end into the right end of the cylinder through a throttle opening in the valve 102.

Thus the shock-absorber 5 after transmission of the electric pulse brakes the movement of the stator 3 until it stops and then brings it back smoothly to its initial position during a predetermined time.

In the case of operating to the "left" i.e. when the lateral seismic waves are to be directed to the left from the support plates 6 it is necessary to set the stator 3 to the position "operating to the left" (FIG. 13b), which is done by that from the sensors 109 and 110 is transmitted a signal to the pneumatic system 96. The compressed air is passed through the radial opening and the axial opening 93 of the rod 83 into the left end of the pneumatic cylinder 81. Under the action of the compressed air the stator 3 with the inertial mass 7 is caused to move to the left up to the stop 106.

Figure 13B:
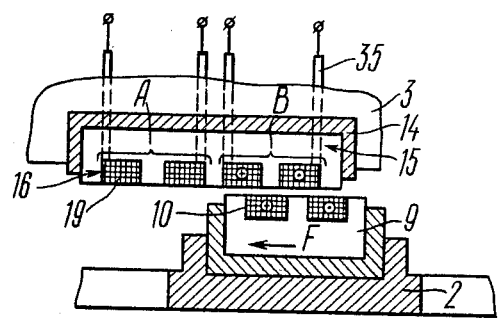

The end position of the stator 3 is remotely controlled with the aid of the contactless sensor 109. The stator 3 is automatically driven to the position "neutral" to start operating to the left (FIG. 13b).

Simultaneously under the action of the compressed air passed into the valve-driving mechanisms 104 and 105 the valve 102 is opened and the valve 103 is closed. In this position the apparatus is ready to operate (to the left).

When an electric pulse is applied across the winding 18 of the stator 3 and the winding 12 of the armature 2 a power pulse is generated, which power pulse is transmitted from the frame 8 of the armature 2 to the support plates 6 wherefrom said power pulse is horizontally applied to the ground to the left, to thereby excite a lateral seismic wave. The back-blow of the power pulse is received by the stator 3 with the inertial mass 7. The stator 3 is moving in the opposite direction (to the right) along the guides 4. The hydraulic cylinder 82 of the shock-absorber 5 does not prevent the stator 3 from smoothly moving since the valve 102 is open, and the valve 103 is opened under the pressure of the hydraulic fluid, produced in the left end of the cylinder 82 when the latter is moving together with the stator 3 to the right. Simultaneously the pneumatic cylinder 81 slows down the movement of the stator 3 due to that the air is compressed in the left end of said cylinder. After the full stop the stator 3 is caused to move back to its initial position. Simultaneously the hydraulic cylinder 82 brakes the movement of the stator 3 while the latter is moving to its initial position to thereby prevent pounding of said stator against the stop 106, which is achieved by that the valve 103 is closed and the hydraulic fluid is forced from the left end into the right end of said cylinder through the throttle opening of the valve 103.

What we claim is:

1. An electrodynamic generator for generating seismic pulses comprising:
   a reference element mounted on the test ground;
   an armature mounted on said reference element;
   a frame of said armature;
   a hollow cylindrical magnet core of said armature secured to said frame and having an active surface in the form of alternating annular projections and annular slots;
   an electric winding of said armature in the form of sections laid into and substantially flush with said annular slots so as to form a row of opposite poles;
   a stator;
   a guide for reciprocal movement of said stator, one and the other ends of said guide; said one end resting on said frame of said armature;
   a frame of said stator;
   a hollow cylindrical magnet core of said stator secured to said frame and having an active surface in the form of alternating annular projections and annular slots;
   an electrical winding of said stator in the form of sections laid into and substantially flush with said annular slots so as to form a row of opposite poles;
   said armature and said stator concentrically disposed in such a manner that said active surfaces of said magnet cores of said armature and said stator face one another and said annular projections of said magnet core of said armature are disposed opposite to said sections of said electric winding of said stator and, conversely, said annular projections of said magnet core of said stator are positioned opposite said sections of said electric winding of said armature, thus creating relative linear displacement thereof when said armature and said stator are in electromagnetic interaction; said displacement of said armature and said reference element excites a seismic pulse in the test ground;
   inertial mass connected with said stator and intended for limiting said linear displacement of said stator with respect to said armature;
   a shock-absorber of said stator intended for smoothly lowering said stator and said inertial mass.

2. An electrodynamic generator as claimed in claim 10, wherein the annular projections of said armature magnet core and of said stator magnet core are wider than the annular projections of said magnet cores.

3. An electrodynamic generator as claimed in claim 2, wherein each section of the winding of said armature and each section of the winding of said stator is composed of a first portion and a second portion, said first and second portions being connected with corresponding portions of the adjacent sections via connecting conductors laid in a bifilar manner into the ducts provided in the magnet core of said armature and in the magnet core of said stator; the first and the second portions of the winding section of said armature and of the winding section of said stator, disposed in one end annular slot of the magnet core of said armature and of the magnet core of said stator have terminal leads; the first and the second portions of the section of the winding of said armature and of the winding of said stator, disposed in the other end annular slot of the magnet core of said armature and of the magnet core of said stator being directly connected to each other.

4. An electrodynamic generator as claimed in claim 10, including an enclosure made in the form of a cap to the cover of which are rigidly connected the end of said guide of said stator and the end of the rod of said shock-absorber of said stator, said enclosure enveloping said armature so that the latter may freely move therein, and the frame of said armature being connected with said guide of said stator for their relative longitudinal motion.

5. An electrodynamic generator as claimed in claim 4, including a mechanism for fixing said generator in a horizontal plane, a mechanism for fixing said generator in a vertical plane, and a lifting mechanism.

6. An electrodynamic generator as claimed in claim 5, wherein said mechanism for fixing said generator in a horizontal plane is formed by an annular projection having conical lateral surfaces and guides, said annular projection being disposed on the surface of said enclosure, and also rollers interacting with the surface of said annular projection; said mechanism for fixing said generator in a vertical plane is formed by the other annular projection provided on said enclosure and adjustable stops interacting with said other annular projection; said lifting mechanism is made in the form of a hydraulic cylinder, a flexible member and a pulley assembly, said hydraulic cylinder being connected through said pulley assembly and said flexible member with the upper portion of said enclosure.

7. An electrodynamic generator as claimed in claim 5, wherein said mechanism for fixing said generator in a horizontal plane is formed by rods securedly fixed to said enclosure, and stationary rollers interacting with said rods; said mechanism for fixing said generator in a vertical plane is provided with a pin-type lock mounted to be engaged in holes provided in said rods; said lifting mechanism is formed by a hydraulic cylinder pivoted in two planes perpendicular to one another, and a flexible member, said hydraulic cylinder is pivotally connected to the upper portion of said enclosure.

8. An electrodynamic generator for generating seismic pulses comprising:
   a reference element mounted on the test ground;
   an armature mounted on said reference element;
   a frame of said armature;
   a hollow cylindrical magnet core of said armature secured to said frame and having an active surface in the form of alternating annular projections and annular slots;

an electrical winding of said armature in the form of sections laid into and substantially flush with said annular slots so as to form a row of opposite poles;

a stator;

a guide for reciprocal movement of said stator, one and the other ends of said guide; said one end resting upon said frame of said armature;

a frame of said stator;

a hollow cylindrical magnet core of said stator; secured to said frame and having an active surface in the form of alternating annular projections and annular slots;

an electrical winding of said stator in the form of sections laid into an substantially flush with said annular slots so as to form a row of opposite poles;

said armature and said stator concentrically disposed in such a manner that said active surfaces of said magnet cores of said armature and said stator face one another and said annular projections of said magnet core of said armature are located opposite said sections of said electric winding of said stator and, conversely, said annular projections of said magnet core of said stator are disposed opposite said sections of said electric winding of said armature, creating during the electromagnetic interaction of said armature and said stator their relative linear displacement; said displacement of said armature and said reference element excites a seismic pulse in the test ground;

inertial mass connected with said stator and intended for limiting said linear displacement of said stator with respect to said armature;

a shock-absorber of said stator intended for smoothly lowering said stator and inertial mass;

said armature is at least twice shorter than said stator, said annular slots of said magnet core of said stator are arranged in groups cored at the edges of magnetic core, the number of said annular slots of each of said groups of said magnet core of said stator is equal to that of said annular slots of said magnet core of said armature.

9. An electrodynamic generator as claimed in claim 11, wherein said guide is made in the form of at least two horizontal sliding columns rigidly connected with said supporting element having two plates adapted to be driven into the ground and located on the both sides of and rigidly connected to said armature; said shock-absorber is made in the form of a pneumohydraulic cylinder whose cylinders are rigidly connected with said stator, and the rods are connected with the plates of the supporting element.

* * * * *